US009590920B2

(12) United States Patent
Kanigicherla et al.

(10) Patent No.: US 9,590,920 B2
(45) Date of Patent: Mar. 7, 2017

(54) MULTI-HOST ETHERNET CONTROLLER

(75) Inventors: Balaji Kanigicherla, Andhra Pradesh (IN); Krishna Mohan Tandaboina, Andhra Pradesh (IN); Laxmi Narayana Yakkala, Andhra Pradesh (IN); Sitaram Banda, Andhra Pradesh (IN); Chaitanya K, Andhra Pradesh (IN); Hari Prasad Koluguri, Andhra Pradesh (IN); Ravikanth Aluru, Andhra Pradesh (IN)

(73) Assignee: Ineda Systems, Inc., Santa Clara, CA (US)

( * ) Notice: Subject to any disclaimer, the term of this patent is extended or adjusted under 35 U.S.C. 154(b) by 224 days.

(21) Appl. No.: 14/112,410

(22) PCT Filed: Apr. 17, 2012

(86) PCT No.: PCT/IN2012/000273
§ 371 (c)(1),
(2), (4) Date: Jun. 5, 2014

(87) PCT Pub. No.: WO2012/143943
PCT Pub. Date: Oct. 26, 2012

(65) Prior Publication Data
US 2014/0286347 A1 Sep. 25, 2014

(30) Foreign Application Priority Data
Apr. 18, 2011 (IN) .......................... 1332/CHE/2011

(51) Int. Cl.
*H04L 12/931* (2013.01)
*H04L 12/54* (2013.01)
(Continued)

(52) U.S. Cl.
CPC ...... *H04L 49/352* (2013.01); *H04L 12/40013* (2013.01); *H04L 12/5693* (2013.01);
(Continued)

(58) Field of Classification Search
CPC ... H04L 49/352; H04L 63/0428; H04L 47/10; H04L 47/266; H04L 45/04; G06F 9/547; G06F 13/28
(Continued)

(56) References Cited

U.S. PATENT DOCUMENTS 6,628,613 B1 * 9/2003 Joung ..................... H04L 47/10
370/230
6,920,132 B1 * 7/2005 Lo .......................... H04L 49/40
370/386
(Continued)

FOREIGN PATENT DOCUMENTS

CN 101741664 6/2010
CN 101855874 10/2010

OTHER PUBLICATIONS

Zhan, Jun-peng, Li Peng, "Design Method of Triple Speed Ethernet Based on Altera FPGA," *Laboratory of 204, Xi'an Electronics University of Science and Technology*, Feb. 2009, pp. 50-52, vol. 17, No. 2, Xi'an, China.
(Continued)

*Primary Examiner* — Andrew Lai
*Assistant Examiner* — Mahmudul Hasan
(74) *Attorney, Agent, or Firm* — Workman Nydegger

(57) ABSTRACT

Described herein is a system having a multi-host Ethernet controller (102) configured to provide communication and control between two or more independent host processors (104) and a network device. In one implementation, the multi host Ethernet controller (102), having an integrated L2 switch (110) to enable a plurality of independent host systems to access same physical gigabit network port concurrently. Each host processor (104) sees the controller as PCI based independent network controller and accesses the controller using its own mini-port driver. The common programming parameters such as Link Speed or Inter Packet
(Continued)

Gap (IPG) are programmed by a virtualization engine. Packets from network (LAN) are switched based on MAC destination address and sent to corresponding host based on MAC destination address. Packets from each host processor (104) are forwarded to network interface or other host processor (104) based on MAC destination address.

13 Claims, 2 Drawing Sheets

(51) Int. Cl.
*H04L 12/40* (2006.01)
*H04L 12/861* (2013.01)
*H04L 29/06* (2006.01)

(52) U.S. Cl.
CPC ...... *H04L 49/9063* (2013.01); *H04L 63/0428* (2013.01); *H04L 69/16* (2013.01)

(58) Field of Classification Search
USPC ......... 370/401, 392; 709/238, 245, 225, 250
See application file for complete search history.

(56) References Cited

U.S. PATENT DOCUMENTS

| | | | | |
|---|---|---|---|---|
| 7,945,705 | B1* | 5/2011 | Eiriksson et al. | 710/8 |
| 7,953,074 | B2* | 5/2011 | Pettey | H04L 49/356 370/362 |
| 8,069,293 | B1* | 11/2011 | Rogan | G06F 13/385 370/248 |
| 2002/0061012 | A1* | 5/2002 | Thi et al. | 370/352 |
| 2002/0083231 | A1* | 6/2002 | Chiang | H04L 69/32 710/16 |
| 2002/0161918 | A1* | 10/2002 | Asano | H04L 45/04 709/238 |
| 2003/0200315 | A1* | 10/2003 | Goldenberg | H04L 47/10 709/225 |
| 2004/0028048 | A1* | 2/2004 | Jin | H04L 12/462 370/392 |
| 2004/0139313 | A1* | 7/2004 | Buer | H04L 29/06 713/150 |
| 2004/0143734 | A1* | 7/2004 | Buer | H04L 63/0428 713/153 |
| 2004/0172485 | A1* | 9/2004 | Naghshineh | G06F 13/4027 709/250 |
| 2005/0013317 | A1* | 1/2005 | Lindsay | H04L 49/9063 370/462 |
| 2005/0015535 | A1* | 1/2005 | Lindsay | H04L 12/40032 710/306 |
| 2005/0031347 | A1* | 2/2005 | Soto | H04B 10/2503 398/58 |
| 2005/0097378 | A1* | 5/2005 | Hwang | G06F 1/3203 713/320 |
| 2005/0147117 | A1* | 7/2005 | Pettey | H04L 49/356 370/463 |
| 2006/0083253 | A1* | 4/2006 | Park | H04L 12/2801 370/401 |
| 2006/0253619 | A1* | 11/2006 | Torudbakken | G06F 13/4022 710/31 |
| 2007/0064089 | A1* | 3/2007 | Pulitzer | H04N 7/147 348/14.01 |
| 2007/0073915 | A1* | 3/2007 | Go | G06F 13/28 710/11 |
| 2008/0019368 | A1* | 1/2008 | Liu et al. | 370/392 |
| 2009/0132742 | A1* | 5/2009 | Simmons | H04L 49/40 710/106 |
| 2009/0210601 | A1* | 8/2009 | Greenstein | H04L 69/32 710/305 |
| 2009/0262741 | A1* | 10/2009 | Jungck et al. | 370/392 |
| 2009/0303876 | A1* | 12/2009 | Wu | H04L 47/10 370/230.1 |
| 2010/0115174 | A1* | 5/2010 | Akyol | G06F 13/385 710/316 |
| 2011/0106981 | A1* | 5/2011 | Watkins et al. | 710/9 |
| 2011/0191610 | A1* | 8/2011 | Agarwal | G06F 1/3203 713/310 |
| 2012/0236734 | A1* | 9/2012 | Sampath | H04L 12/413 370/252 |
| 2012/0236869 | A1* | 9/2012 | Julien | H04L 49/351 370/400 |
| 2012/0254492 | A1* | 10/2012 | Li | G06F 13/24 710/269 |

OTHER PUBLICATIONS

Written Opinion of the International Search Report for PCT/IN2012/000273 mailed Nov. 8, 2012.

International Search Report, PCT/IN2012/000273, Completed Oct. 11, 2012, Mailed Nov. 8, 2012, China International Search Authority.

* cited by examiner

MULTI-HOST ETHERNET CONTROLLER

CROSS-REFERENCE To RELATED APPLICATIONS

This application claims priority to and the benefit of PCT Application Ser. No. PCT/IN2012/000273, filed on Apr. 17, 2012, entitled "MULTI-HOST ETHERNET CONTROLLER", which also claims priority to and the benefit of Indian Patent Application No. 1332/CHE/2011, entitled "MULTI-HOST ETHERNET CONTROLLER", filed on Apr. 18, 2011, which are incorporated herein in their entirety.

TECHNICAL FIELD

The present subject matter relates, in general, to a computing system having multi-host processors and, in particular, to an Ethernet controller for the multi-host processors.

BACKGROUND

Computer networks necessitate the provision of various communication protocols to transmit and receive data. Typically, a computer network comprises a plurality of devices, such as computers, printers, and other computer peripherals, communicatively connected together. Data is transferred between each of the devices through data packets which are communicated through the network using a communication protocol standard. Examples of the communication protocol standards include Internet Protocol (IP), Point-to-Point Protocol (PPP), and Transmission Control Protocol (TCP). Each network device includes a combination of hardware and software that translates protocols and process data. For example, an Ethernet controller connects multiple computers on a wired network.

A conventional Ethernet controller is connected to a single host and provides network connectivity based on standard Ethernet protocol with various performance features, such as Tx/Rx Offload (Checksum offloads, address filtering, VLAN filtering etc). In the Ethernet protocol, a media access control (MAC) layer acts as an interface between a Logic Link Layer and Physical (PHY) Layer. The MAC layer, thus, transforms data packets from the host processor (also referred to as host herein) and sends the data packets to the physical (PHY) layer, typically using Media Independent Interfaces, which serialize the data and transmit on the wired network. Similarly, incoming data packets are processed and sent to the host via offload engines.

More recently, multiple operating systems on single host or multiple host systems are being developed. When multiple operating systems are developed, a virtualization intermediary (VI), such as virtual machine monitor (VMM) or Hypervisor, is also implemented to enable multiple different operating systems. The VMM enables the sharing of the peripherals generally connected to an I/O controller. However, such software based virtualization solutions cause high latencies and thus sharing of a network device with the software solution can become a bottleneck in the overall system performance.

When there are multiple hosts connected to a shared peripheral pool, the hosts either access the peripherals on a sequential basis or each host is connected to a dedicated peripheral. While sequential accessing of shared peripherals affects the system performance, having dedicated peripherals for each of the hosts may add up to the overall cost of the system and increase in the overall power consumption.

SUMMARY

This summary is provided to introduce concepts related to an Ethernet controller for a multi-host system, which are further described in the detailed description. This summary is not intended to identify essential features of the present subject matter, nor is it intended for use in determining or limiting the scope of the present subject matter.

In one implementation, the multi-host Ethernet controller includes an integrated layer 2 switch for enabling two independent host systems to access same physical gigabit network port concurrently. Each host sees the controller as peripheral connect interface (PCI) based independent network controller and accesses the controller using its own mini-port driver. Common programming parameters such as Link Speed or Inter Packet Gap (IPG) are programmed by a Virtualization Engine. Packets from network (LAN) are switched based on MAC Destination address and sent to corresponding host based on the MAC address. Packets from each host are forwarded to network interface or other host based on MAC Destination Address. Packets from different hosts are scheduled on network transmit interface in round robin scheme.

BRIEF DESCRIPTION OF THE DRAWINGS

The detailed description is described with, reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
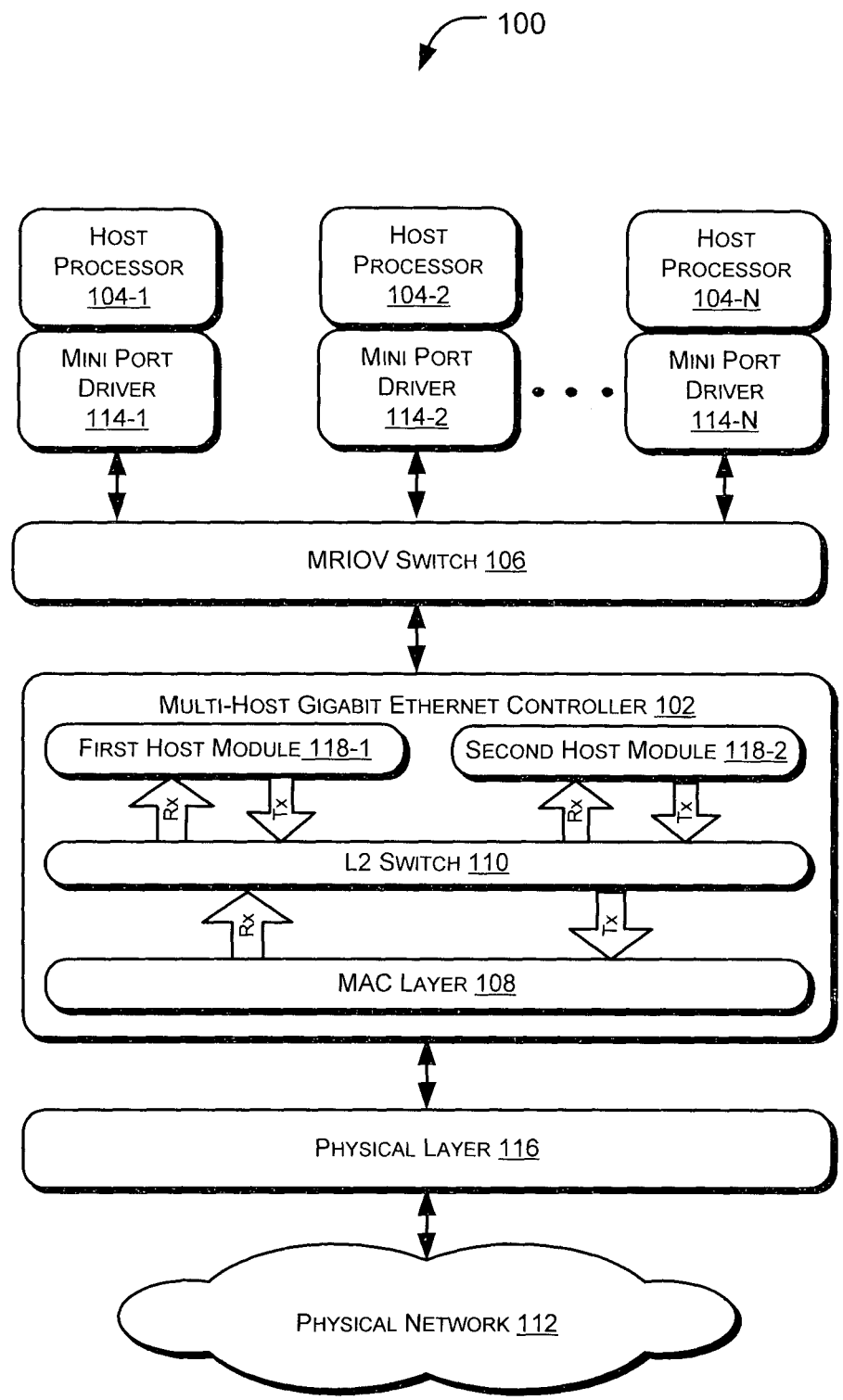
FIG. 1 illustrates a multi-host computing system implementing a multi-host gigabit Ethernet controller, according to an embodiment of the present subject matter.

The present subject matter relates, in general, to a computing system having multi-host processors and, in particular, to an Ethernet controller for the multi-host processors.

Typically, any computing device, for example, a desktop computer, a server, and a portable computer, includes network devices to communicate with printers, fax machines, other computing devices, etc. Data is transferred between each of the devices through data packets which are communicated through the network using a communication protocol standard. Examples of the communication protocol standards include Internet Protocol (IP), Point-to-Point Protocol (PPP), and Transmission Control Protocol (TCP). Ethernet is one of the network interfaces for connecting multiple hosts on a wired network to enable communication of the host processors with a network device.

Typically, a single host includes an Ethernet controller, which facilitates communication between the host and the network devices. For multi-host systems, however, the options are either cost intensive or have degraded system performance. For example, in one scheme, the multiple host systems are connected to a shared peripheral pool and each of the host systems access the peripherals on a sequential basis. However, this results in degraded system performance. In another scheme, when multiple hosts are integrated into one system or chassis, each host gets its own set of resources, including Ethernet controller. Thus, each host gets its own dedicated Ethernet controller and there is no sharing of peripherals. However, the drawbacks are the cost of a second or third Ethernet controller, requiring two or more Ethernet switch ports to connect the system in the network; real-estate on the motherboard (or on the system on chip) for the second Ethernet controller and PHY layer, increased power consumption of the system, and managing multiple Ethernet controllers in the system.

Further, in a virtualized environment, where there are multiple system images, each of the virtual machines gets the virtualized view of some of the peripheral Ethernet controllers. In this scheme, for instance, the parent machine still owns the Ethernet controller and controls the Ethernet controller configuration. When the virtual machine is set to NAT mode, the parent machine acts as an internet proxy and provides the network connectivity through software based network adapter in the virtual machine. In this mode, although the virtual machine is getting the connectivity, the virtual machine is still using the Ethernet controller associated with the parent machine, which slows down the parent machine and consumes the parent resources.

In another case, a virtual machine may be connected to the parent machine in a bridge mode. In this case, a software based layer-2 switch is implemented in the parent machine. In addition to this, a virtual adapter and a physical adapter are bridged together to switch the packets between the virtual machine and the parent machine. Additionally, in this method, promiscuous mode needs to be enabled in a physical network controller to forward all the packets destined for both the parent as well as the virtual machine. In this mode, the disadvantage is that the switch is running in the software, and there needs to be a memory copy between parent memory area to the guest operating system memory area. Since the physical Ethernet controller is put in the promiscuous mode, the network stack needs to process lot of unintended packets arriving into the system which otherwise would have been dropped in the physical Ethernet controller using unicast filtering.

However, the introduction of single root input output virtualization (SR-IOV) based Ethernet controller, removes some of the memory copy requirements and allows direct movement of packets into the guest operating system's memory. But, these are meant only for single hosts with multiple virtual machines sharing the single SR-IOV based Ethernet controller. The SR-IOV based Ethernet controller cannot satisfy the requirement of multi-host systems as inherently multi-host systems have different CPU sub-systems and respective system memory.

To this end, the embodiments described herein provide for a multi-host gigabit. Ethernet controller, which allows multiple hosts to concurrently access a network device. In one implementation, the multi-host gigabit Ethernet controller is configured to direct memory access (DMA) the packets, simultaneously to both the host systems.

In one implementation, the multi-host gigabit Ethernet controller supports multiple hosts with a common MAC layer and a Layer-2 (L2) switch, which enables both hosts to access a physical network interface concurrently. Each host transmits and receives data packets independently. Further, each host has dedicated registers for host (offload related registers) and common registers to control the MAC layer and the L2 switch. The common programming parameters, such as Link Speed or Inter Packet Gap (IPG) are programmed by a Virtualization Engine. The data packets from the network, e.g., local area network (LAN) are switched based on a received MAC destination address and sent to a corresponding host based on the MAC destination address. Similarly, the data packets from each of the hosts are forwarded to the network interface or other host based on the MAC destination address. The data packets from different hosts may also be scheduled for the network using round robin methods.

The multi-host gigabit Ethernet controller described herein is also capable of power management control, interrupt handling, and handling broadcast and multicast data packets.

Devices that can implement the disclosed system(s) and method(s) include, but are not limited to, desktop computers, hand-held devices, multiprocessor systems, microprocessor based programmable consumer electronics, laptops, network computers, minicomputers, mainframe computers, and the like which utilize multiple processors on the same hardware platform. In one implementation, the method can also be implemented for systems running any operating system, such as Linux, Unix, Microsoft® Windows®, Mac OS X®, Android, and the like. Although the description herein is with reference to certain multi-host computing systems running particular operating systems, the systems and methods may be implemented in other operating systems and computing systems, albeit with a few variations, as will be understood by a person skilled in the art Multiple operating systems are typically used to perform different functions on the same hardware platform. Each operating system may provide a particular advantage over different operating system (OS). For example, in a multi-host computing system which may run two different operating systems, OS 1 and OS 2, the OS 1 may provide better performance or support more applications than OS 2 however, the OS 2 may consume less resources, such as memory, processing power, battery power when compared to OS 1. In such a scenario, the computing system may implement OS 1 for application processing and computational purposes whereas may implement OS 2 during idle state.

FIG. 1 illustrates a multi-host computing system 100 implementing a multi-host gigabit multi-host Ethernet controller 102, according to an embodiment of the present subject matter. In said embodiment, the multi-host computing system 100, also referred to as system 100 hereinafter, includes host processors 104-1, 104-2, . . . , 104-N, collectively referred to as host processors 104. The host processors 104 may include microprocessors, microcomputers, microcontrollers, digital signal processors, central processing units, state machines, logic circuitries, and/or any devices that manipulate signals and data based on operational instructions.

Each of the host processors 104 is associated with a multi-root aware input output virtualization (MRIOV) switch 106. In one implementation, the MRIOV switch 106 is based on the Peripheral Component Interconnect Express (PCIe) protocol. The standard for virtualizing I/O devices and further, routing information between the virtualized I/O devices and multiple host processors 104 using MRIOV switch 106 based on the PCIe protocol have been defined by the Peripheral Component Interconnect Special Interest Group (PCI-SIG) in the MRIOV standard. The MRIOV standard defines how the MRIOV switch 106 can be implemented in a PCIe environment, which enables multiple ports to simultaneously share PCIe compliant I/O devices. In another implementation, the MRIOV switch 106 may also be a multi-protocol MRIOV switch configured for other communication protocols and/or for I/O devices that are compliant with such communication protocols. Examples of the other widely used communication protocols include, but are not limited to, Virtual Component interface (VCI), Basic Virtual Component Interface (BVCI), Advanced Extensible Interface (AXI), Advanced High Performance Bus (AHB), Advanced Virtual Component Interface (AVCI), Open Code Protocol (OCP), Peripheral Virtual Component Interface (PVCI), Brain Computer Interface (BCI), etc. Thus, the MRIOV switch 106 may be configured to route data between multiple host processors 104 and network devices (not shown) adhering to different communication protocols.

In one implementation, the MRIOV switch 106 is connected to the multi-host gigabit Ethernet controller 102, hereinafter interchangeably referred to as multi-host Ethernet controller 102. The multi-host Ethernet controller 102 includes a MAC layer 108 and a layer-2 switch 110 to enable concurrent communication between one or more network devices, such as printer, fax machines, computers, etc., and the host processors 104 in the system 100 through the network 112. Examples of network 112 include any wired network, such as local area network, wide area network, etc.

Further, on the host side, the multi-host Ethernet controller 102 has N number of data path interfaces to interface with N number of host processors 104. DMA accesses will take place at the data path interfaces. The data path interfaces, for example, can be standard AMBA based AXI interfaces to move the data packets between temporary memory storage and host systems main memory. Also, the multi-host Ethernet controller 102 has N control path interfaces, where the mini-port drivers 114-1, 114-2, . . . 114-N, associated with each of the host processors 104 interface with the multi-host Ethernet controller 102. Each of the host processors 104 also has dedicated set of registers to program receive and transmit descriptors, bus interface, queue configuration, various filters, such as L2/L3, VLAN, RSS, etc. In addition, there exists another control path interface from where a virtualization engine can enter and program the common set of registers such as Link Speed, Auto Negotiation enable/disable, Inter packet gap, etc. Since there are separate registers for each of the host processors 104, neither of the host processors 104 has any knowledge of the existence of other host nor has any dependency on the other host for successful access of the physical network interface.

In operation, each of the host processors 104 communicates with the network 112 using the independent set of configuration registers in the multi-host Ethernet controller 102 through a physical (PHY) layer 116. More specifically, each of the host processors 104 independently interacts with the multi-host Ethernet controller 102 using separate DMA channels to the network 112. To this end, each of the host processors 104 includes a corresponding host module within the multi-host Ethernet controller 102. For example, the multi-host Ethernet controller 102 includes a first host module 118-1 corresponding to the host processor 104-1, a second host module 118-2 corresponding to the host processor 104-2, and so on.

In one embodiment, the multi-host Ethernet controller 102 gracefully switches control of the network device from one host processor; say the host processor 104-1, to another host processor, e.g., the host processor 104-2 in a predefined time frame so as to provide seamless user experience. This is further explained with reference to the subsequent figure(s).

Figure 2:
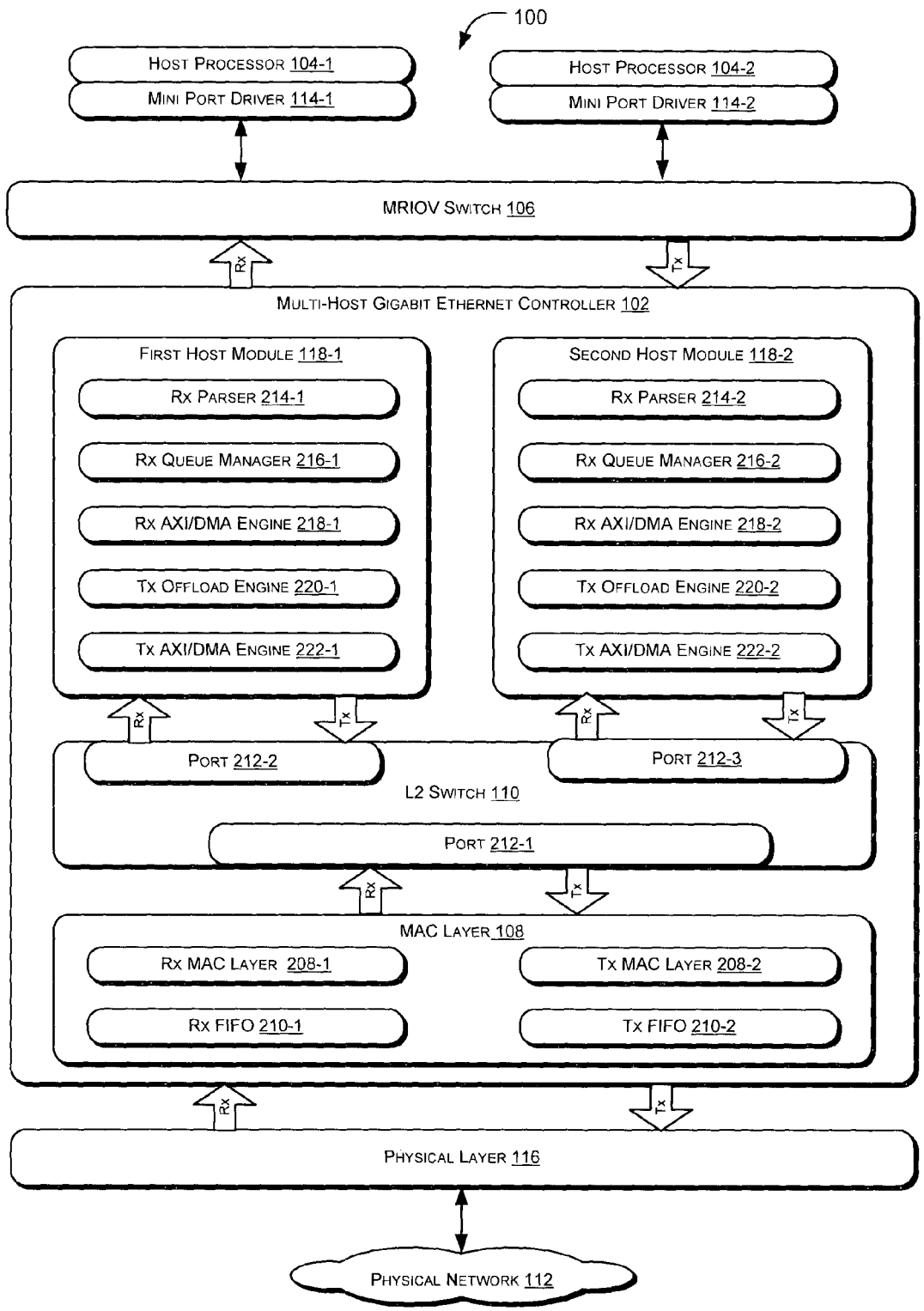
FIG. 2 illustrates architecture of the exemplary multi-host gigabit Ethernet controller within the system, in accordance with an embodiment of the present subject matter.

FIG. 2 illustrates architecture of the exemplary multi-host Ethernet controller 102 within the system 100, in accordance with an embodiment of the present subject matter. As mentioned before, the system 100 includes a plurality of host processors 104 and the MRIOV switch 106. As an illustration, only two host processors 104-1 and 104-2 are shown to interact with one or more network devices via the network 112; however multiple host processors may be present as will be understood by a person skilled in the art.

In said embodiment, the multi-host Ethernet controller 102 includes at least one media access control (MAC) layer 108, the layer-2 (L2) switch 110, the first host module 118-1 and the second host module 118-2. The physical layer (PHY) 116 is configured to allow serial transmission of data packets between the multi-host Ethernet controller 102 and the network 112.

The MAC Layer 108 is common to both the hosts 104-1 and 104-2, and therefore, both the host processors 104 use the same MAC layer 108 to transmit and receive the data packets. The MAC layer 108 further includes an Rx MAC layer 208-1 and a Tx MAC layer 208-2. The Rx MAC layer 208-1 handles the data packets from the PHY layer 116 and is responsible for packet reception, burst packet reception, and frame reception with carrier extension, false carrier extension, false carrier indication in addition to the packet formation according to the internal data path requirements and cyclic redundancy check (CRC). The Tx MAC layer 208-2, on the other hand, handles the basic frame transmission, propagating error with frame transmission, propagating carrier extension with frame transmission, handling pause frame and handling collisions. The MAC layer 108 further includes an Rx FIFO 210-1 and a Tx FIFO 210-2 for intermittently storing the data packets received/being transmitted from/to the network 112.

Further, the L2 switch 110, in said implementation, is a 3-port device, having a port 212-1, a port 212-2 and a port 212-3, commonly referred to as ports 212 hereinafter. The L2 switch 110 may have dedicated PCI link for each port to be connected to the host processors 104. As shown, the port 212-1 is for transmitting and receiving data packets between the L2 switch 110 and the MAC layer 108; while the ports 212-1 and 212-3 are for transmitting and receiving data packets between the L2switch 110 and the host processors 104-1 and 104-2 respectively. Hence, the L2 switch 110 handles data traffic in three directions, two from both the host processors 104 and one from the network 112 via the MAC layer 108. There is a dedicated amount of buffer memory within the L2 switch 110 to store the packets temporarily if the L2 switch 110 is busy with the other ports 212. The L2 switch 110 has also stored thereon a fixed destination address based forwarding table (also referred to as forwarding table) with four MAC address entries per host processor 104. In the receive direction, it is determined whether the incoming data packet does not match with any of the eight address entries, the data packet is flooded to both the host processors 104. In the transmit direction, the MAC destination address is only checked to see if the outgoing data packet is destined for other host processor, else the data packet is sent on the network 112.

In one implementation, the system 100 performs device initialization, which includes link speed configuration. At power-up, the MAC layer 108 asserts the RESET to the PHY layer 116 and de-asserts the RESET after programmable amount of time, depending on properties of a PHY device within the PHY layer 116. When the RESET is de-asserted, the PHY layer 116 configures itself and performs auto-negotiation to determine the speed of the network device on the other side of the link. The link status information is captured in a PHY status register (not shown) which is read by the MAC layer 108. The MAC layer 108 implements periodic polling to read the PHY status register and determine whether the link status information has changed. If the link status information has changed, the MAC layer 108 posts an interrupt to both the host processors 104. Based on the interrupt, the mini-port driver 114-1 or 114-2 takes an action depending on whether the link is down or up. This is discussed in the subsequent paragraphs.

In the Receive Direction:

The Rx MAC layer 208-1 in the MAC layer 108 receives one or more data packets from the network 112 via the PHY layer 116 and stores the data packets in the Rx FIFO layer 210-1. Once the data packet is out of the Rx MAC layer 208-1, it is not known whether the data packets are destined for host processor 104-1 or the host processor 104-2.

Thus, in one embodiment, the L2 switch 110 takes the frame and parses it to determine the MAC destination address. The L2 switch 110 matches the MAC destination address with the addresses stored in the forwarding table. If the L2 switch 110 finds a match, the data packet is transmitted to the corresponding host module. For example, if the MAC destination address is determined to be the address of the host processor 104-1, the data packet is routed to the first host module 118-1.

The first host module 118-1 includes an Rx Parser 214-1, an Rx Queue Manager 216-1, and an Rx AXI/DMA engine 218-1. Additionally, the first host module 118-1 also includes a Tx offload engine 220-1 and a Tx AXI/DMA engine 222-1. Similarly, the second host module 118-2 includes an Rx Parser 214-2, an Rx Queue Manager 216-2, an Rx AXI/DMA engine 218-2, a Tx offload engine 220-2, and a Tx AXI/DMA engine 222-2. The host modules 118-1 and 118-2 are specific to each host processors 104 and thus facilitate the host processors 104 to concurrently access the network devices. This, in turn, helps in improving the performance of the overall system.

For the sake of explanation, if the data packet is for the first host module 118-1, the Rx Parser 214-1 inspects the received data packets and sends the data packets to the Rx Queue Manager 216-1. The Rx Queue manager 216-1 either stores the data packets temporarily or drops the data packets if there is no space in the on-chip memory buffer (not shown). Accordingly, the data packets are sent to the destination host processor, in this example, host 104-1.

If, on the other hand, the L2 switch 110 cannot resolve the MAC destination address based on the forwarding table, the data packets are sent to both the host processors 104. Alternatively, the data packet may be sent to both the host processors 104 if the packet is the MAC destination address is a broadcast address. The multi-cast packets, too, are forwarded to the host processors 104 based on host configuration. Once the packet reaches the host module 118, the respective Rx Parsers treat the data packets as per pre-configured rules.

In the Transmit Direction:

For the purpose of illustration only, consider that the host processor 104-1 sends data packets to the network 112. The data packet is scheduled for transmission as soon as the mini port driver 114-1 updates the head pointer in the transmit descriptor circular buffer. The Tx AXI/DMA engine 222-1 fetches the frame and forwards the data packets to the Tx offload engine 220-1. The Tx offload engine 220-1 takes the packets and performs transmit offload tasks as specified by instructions of the mini-port driver 114-1 and prepares the entire ready-to-transmit packet (as it would transmit on the network 112) and stores in another on-chip buffer. Thus, the Tx offload engine 220-1 moves the data packet from the on-chip buffer to Tx FIFO 210-2, through the L2-Switch 110 for final transmission to the network 112. The multi-host Ethernet controller 102 interfaces with the network 112 via Gigabit PHY on GMII or RGMII or MII or RMII interface.

The multi-host Ethernet controller 102 also has a management interface to program the PHY parameters depending on the user selections.

The operation of the multi-host Ethernet controller 102 is further explained in the context of various processes, such as initialization of the network device, the execution of commands in case of switching between two or more host processors 104, interrupt handling, and power management.

In one implementation, the multi-host Ethernet controller 102 is also configured to switch data packets between host processors 104. The plurality of host processors 104 within the system may wish to communicate with each other for different reasons. For instance, one host, say host processor 104-1, may be having a broadband internet connection, and other host processor say host processor 104-2, may wish to get the network connectivity through internet connection sharing or the second host processor 104-2 may want to map one of the first host processor's 104-1 storage as network drive. In such cases, the data packets need to be switched between these host processors. As the Ethernet switching protocol does not allow the packets to be forwarded to same port, there is no mechanism to switch the data packets between multiple host processors 104 behind a conventional single switch port.

To this end, the Layer-2 Switch 110 described herein looks at the MAC destination address of the two host processors 104 and if the packets are destined to one of the two host processors 104, the data packets are forwarded to the host processor else the data packets are generally forwarded on to the network interface.

The multi-host Ethernet controller 102 also implements a technology called "wake-on-LAN" which is a computer networking standard, which allows that a computer can be woken up from a sleep state with specific networking packet. For this, each host processor specifies whether Wake-On-LAN is enabled or not and further can enable the host processor to wake-up based on pattern matching based wake-up. Each host processor 104 provides its address and filter enables and pattern matching rules. The Rx MAC layer 208-1, when armed in sleep state (specific to each host processor), looks for specific data packets. If the Rx MAC layer 208-1 finds any of those data packets, the Rx MAC layer 208-1 , sends a wake event to the chip level power management logic (not shown), which in turn wakes the host processor 104 up.

Additionally, the multi-host Ethernet controller 102 is also capable of interrupt handling. The link status change interrupts are routed to both host processors 104 and each of the host processor 104 has dedicated interrupt logic depending on the type of the processor.

In one implementation, the multi-host Ethernet controller 102 is configured for pause frame handling. For this, when the host-specific on-chip temporary storage gets filled to a predefined threshold level, a 'buffer_full' signal is generated to the L2 Switch 110 which in turn sends to the signal to the Tx MAC layer 208-2. The Tx MAC layer 208-2 then sends a pause frame to the network interface after completion of the transmission of the existing frame (if any). This is host specific so that the Tx MAC layer 208-2 can send the pause packet embedding the corresponding MAC destination address of the data packet.

Although the multi-host Ethernet controller 102 is explained with respect to multiple host processors, it will be appreciated by a person skilled in the art that in absence of multiple host processors and several system images, the multi-host Ethernet controller 102 may be used for giving a direct I/O access to the host processors 104 requesting for the available network device. It will be understood that even though only a few sharing and switching methods are discussed, alternate procedures may also exist as can be perceived by person skilled in art Also, even though implementations of the multi-host Ethernet controller 102 have been described in language specific to structural features and/or methods, it is to be understood that the invention is not necessarily limited to the specific features or methods described. Rather, the specific features and methods are disclosed as exemplary implementations for the multi-host Ethernet controller 102.

We claim:

1. A multi-host Gigabit Ethernet Controller for sharing of a physical network among a plurality of host processors in a multi-host computing system, wherein the multi-host Gigabit Ethernet Controller is communicatively coupled to each of the plurality of host processors through a PCIe based link, the multi-host Gigabit Ethernet Controller comprising:
    a medium access control (MAC) layer common among the plurality of host processors configured to receive data packets for the plurality of host processors through the physical network, wherein the MAC layer is implemented in a data link layer structure, and wherein the MAC layer is further configured to handle wake-on-LAN requests for each of the plurality of host processors;
    a Layer-2 (L2) switch integrated with the multi-host Gigabit Ethernet Controller comprising at least one port for each of the plurality of host processors, and the MAC layer to exchange data packets between the plurality of host processors and the MAC layer, wherein the L2 switch is configured to parse the received data packets from the MAC layer to determine a MAC destination address; and
    a plurality of host modules, each coupled to the L2 switch and a host processor from amongst the plurality of host processors configured to concurrently process the data packets for the host processors received from the L2 switch enabling sharing of the physical network among the plurality of host processors, wherein each of the plurality of host modules is configured as at least one of a Peripheral Component Interconnect Express (PCIe) device, a Peripheral Component Interconnect (PCI) device, a non PCIe compliant device, and a non-PCI compliant device with respect to at least one of the plurality of hosts.

2. The multi-host Gigabit Ethernet Controller as claimed in claim 1, wherein the MAC layer comprises:
    a Rx FIFO configured to store the received data packets from the physical network; and
    a Rx MAC Layer configured to forward the stored data packets to the L2 switch, wherein the Rx MAC layer performs one or more packet reception, burst packet reception, frame reception with carrier extension, false carrier extension, false carrier indication in addition to packet formation according to the internal data path requirements, and cyclic redundancy check.

3. The multi-host Gigabit Ethernet Controller as claimed in claim 1, wherein the MAC layer is further configured to send data packets from the plurality of host processors to the physical network.

4. The multi-host Gigabit Ethernet Controller as claimed in claim 3, wherein the MAC layer comprises:
    a Tx FIFO configured to store the received data packets from the L2 switch; and
    a Tx MAC Layer configured to forward the stored data packets to the physical network, wherein the Tx MAC layer performs one or more basic frame transmission, propagation of carrier extension with frame transmission, handling pause frame, and collision handling.

5. The multi-host Gigabit Ethernet Controller as claimed in claim 1, wherein the L2 switch is further configured to determine a host processor for each of the data packets, based on the determined destination MAC address and a pre-defined forwarding table.

6. The multi-host Gigabit Ethernet Controller as claimed in claim 1, wherein the L2 switch is further configured to forward data packets received from the plurality of host processors to the physical network.

7. The multi-host Gigabit Ethernet Controller as claimed in claim 1, wherein the L2 switch is further configured to forward the received data packets to each of the plurality of host processors, wherein the determined destination MAC address is not associated with any of the host processors.

8. The multi-host Gigabit Ethernet Controller as claimed in claim 1, wherein the MAC Layer is further configured to send an interrupt to at least one of the plurality of host processors upon determination of change in a link status associated with the physical layer and the physical network.

9. The multi-host Gigabit Ethernet Controller as claimed in claim 1, wherein the wake-on-LAN requests are received by the host processors in a low power state for transitioning to an active power state.

10. The multi-host Gigabit Ethernet Controller as claimed in claim 1, wherein the MAC Layer is further configured to pause frame reception and transmission for the host processor based on a received buffer full signal, wherein the buffer full signal is indicative of filled on-chip temporary storage of the host processor.

11. The multi-host Gigabit Ethernet Controller as claimed in claim 1, wherein each of the plurality of host modules comprises:
    a Tx AXI/DMA engine configured to fetch data frames from a host processor, wherein the data frames represent data packets provided by the host processor;
    a Tx offload engine coupled to the Tx AXI/DMA engine, configured to:
        perform transmit offload tasks on data packets received from the host processor to create ready-to-transmit data packets based on the instructions of a mini-port driver coupled to the host processor; and
        store the ready-to-transmit data packets in the Tx FIFO for transmission to the physical network through the L2 switch.

12. The multi-host Gigabit Ethernet Controller as claimed in claim 1, wherein the multi-host Gigabit Ethernet Controller is coupled to the physical network through a Gigabit PHY on one of a Gigabit Media Independent Interface (GMII), Reduced Gigabit Media Independent Interface (RGMII), Media Independent Interface (MII), and Reduced Media Independent Interface (RMII).

13. The multi-host Gigabit Ethernet Controller as claimed in claim 1, wherein the L2 switch is further configured to:
    receive data packets from a host processor from among the plurality of host processors;
    parse the received data packets to determine another destination MAC address, wherein the another destination MAC address is of another host processor from amongst the plurality of host processors; and
    forward the received data packets to the another host processor based on the determined destination MAC address.

* * * * *